United States Patent [19]

Stricklen

[11] Patent Number: 5,393,949
[45] Date of Patent: Feb. 28, 1995

[54] GAS SHIELDING APPARATUS FOR WELDING

[75] Inventor: Gary A. Stricklen, San Mateo County, Calif.

[73] Assignee: Precision Welding Technologies, Inc., San Mateo, Calif.

[21] Appl. No.: 184,701

[22] Filed: Jan. 21, 1994

[51] Int. Cl.⁶ .............................................. B23K 9/167
[52] U.S. Cl. .......................................... 219/74; 219/75
[58] Field of Search ....................................... 219/74, 75

[56] References Cited

U.S. PATENT DOCUMENTS

| | | | |
|---|---|---|---|
| 2,644,070 | 6/1953 | Herbst | 219/74 |
| 2,856,510 | 10/1958 | Jones et al. | 219/74 |
| 2,902,587 | 9/1959 | Bernard | 219/74 |
| 3,125,666 | 3/1964 | Gorman et al. | 219/74 |
| 3,349,213 | 10/1967 | Gorman | 219/74 |
| 3,875,364 | 4/1975 | Boyett | 219/74 |
| 3,944,781 | 3/1976 | Urbanic et al. | 219/74 |
| 4,436,977 | 3/1984 | Cash et al. | 219/75 |
| 4,839,489 | 6/1989 | Dyer | 219/74 |
| 5,003,150 | 3/1991 | Stricklen | 219/75 |
| 5,084,603 | 1/1992 | Bernuchon et al. | 219/74 |

Primary Examiner—Clifford C. Shaw
Attorney, Agent, or Firm—Flehr, Hohbach, Test, Albritton & Herbert

[57] ABSTRACT

A gas shielding apparatus for shielding a weld with a gaseous substance. The gas shielding apparatus includes a shroud body mountable to a torch body having a first plenum for producing a primary shield stream and a first delivery structure for delivering the gaseous substance to the first plenum. The shroud body has a second plenum defining a secondary shield stream substantially surrounding the primary shield stream. A trailer shield portion extends laterally from the shroud body and has a second plenum for producing a trailer shield stream. The apparatus also includes a second delivery structure for delivering measured amounts of the gaseous substance from the first delivery structure to the second plenum and the third plenum. The second delivery structure is coupled to the first delivery structure upstream from the primary plenum when the shroud body is mounted to the torch body.

19 Claims, 2 Drawing Sheets

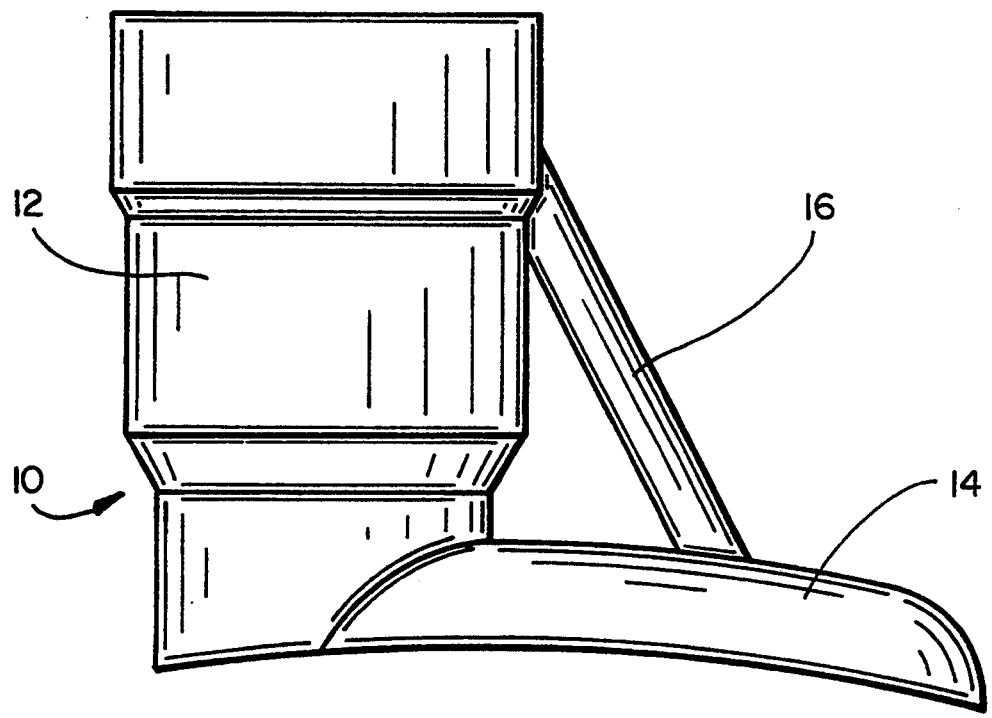
FIG_1
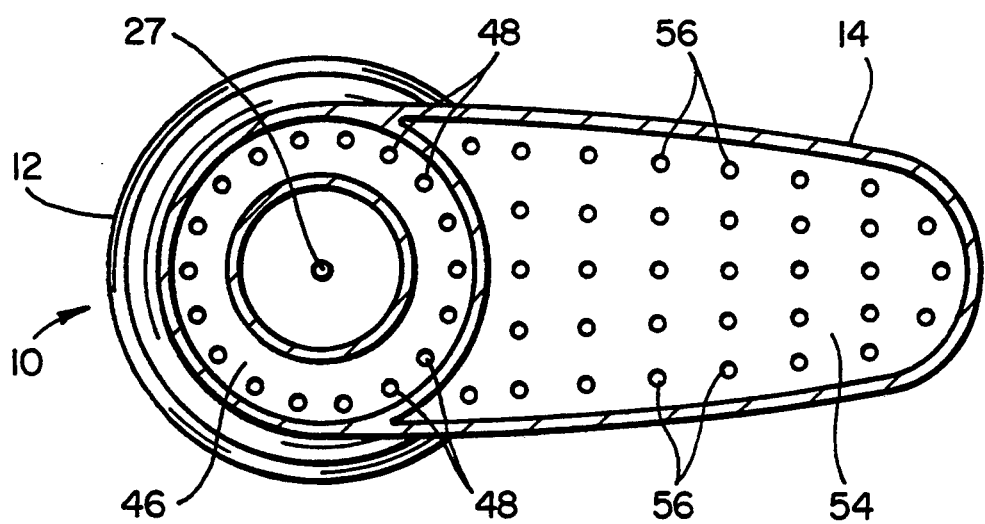
FIG_3

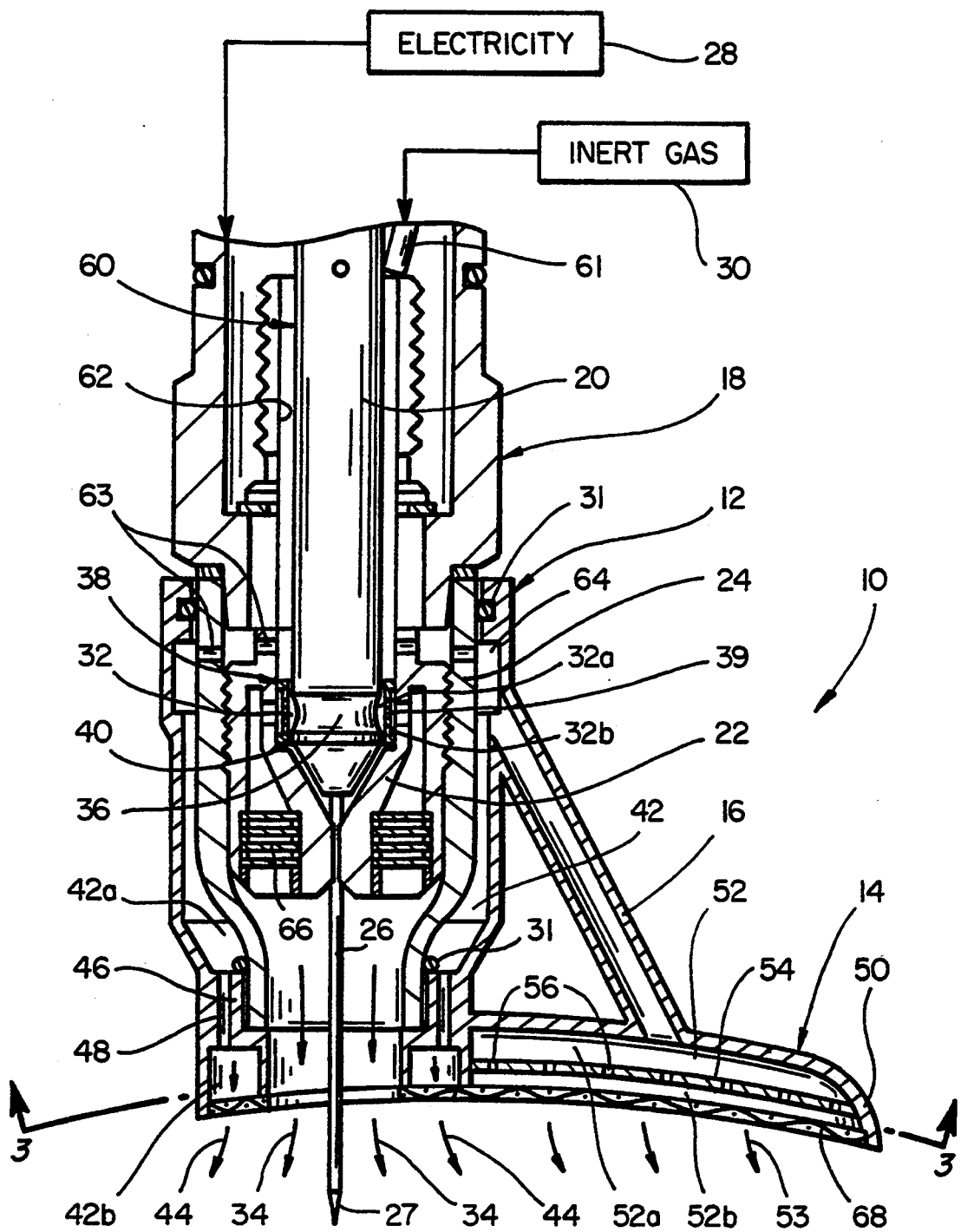
FIG_2

GAS SHIELDING APPARATUS FOR WELDING

This invention relates in general to a gas shielding apparatus and, more particularly, to an apparatus for shielding a weld site.

BACKGROUND OF THE INVENTION

An inert gas, such as argon, is often used during welding to isolate and protect the molten metal of the weld from atmospheric gases. Materials in a molten state often react with gases in the atmosphere and become porous or brittle, reducing the quality of a weld formed with the material. For example, titanium will become brittle when exposed to atmospheric gases at temperatures over 1200° F. During welding, the weld pool and a portion of the weld near the weld site typically have a temperature at which the material is susceptible to contamination by atmospheric gases. For adequate protection against contamination, the molten metal of the weld should be covered with an inert gas.

Various gas shielding devices are available for shielding the molten metal of a weld from atmospheric gases. U.S. Pat. No. 3,875,364 discloses a trailer shield for shielding the wake of the weld where the weld puddle, electrode tip and the arc of the welding torch are shielded by a stream of inert gas flowing from the shielding cup. Since the stream provided by the trailer device is separate from that of the cup, the molten metal between the trailer shielding device and the cup may be exposed to atmospheric gases at a temperature which results in contamination of the weld.

More complete protection for the weld material may be obtained by joining the trailer shield to the welding torch. Gas shielding devices which include a primarily shield section and a trailer shield section are shown in U.S. Pat. Nos. 3,125,666, 3,349,213, 2,856,510 and 4,839,489. The disclosed shielding devices provide more complete protection for the molten metal of the weld than a trailer shield device which is separate from the welding torch. However, atmospheric gases may infiltrate the shielding gas and interact with the molten metal if the gas source for the gas shielding/trailer unit is located some distance from the weld surface. A gas shielding apparatus which provides a protective envelope that is substantially impenetrable by atmospheric gases even when the source of the protective stream is spaced from the weld is desirable.

In general, in the disclosed shielding devices separate gas sources are used for the primary shielding cup of the welding torch and the trailer shield. Using separate sources requires that each welding station have two or more sources of inert gas which may be coupled to the welding assembly. The disclosed devices are unsuitable when only one source of inert gas is available. Additional tubes must be used to couple the gas sources to the welding torch and the shielding device. With the second gas source and the multiplicity of tubes, additional work space is required for each welding station. The numerous tubes may restrict the maneuverability of the welding torch. The main supply and the auxiliary supply must both be monitored when welding a workpiece to ensure that the supplies are functioning properly. A gas shielding device which uses a single gas source for isolating and protecting the molten metal of a weld is desirable.

One type of gas shielding apparatus using a single source of inert gas is disclosed in U.S. Pat. No. 5,003,150. The shielding apparatus is formed for the lateral introduction of the stream of gas into a skirted plenum. The skirted plenum is shaped to cover the weld pool and a portion of the weld behind the weld pool, increasing the area protected by the single stream of gas. A gas shielding apparatus which uses a single gas source to form a two or more separate streams of shielding gas is desirable.

The available gas shielding devices are generally complex and difficult to manufacture and install. The complexity increases the manufacturing costs of the devices. Removal of the shielding device from the torch for maintenance, replacement of the electrode, transfer to a different welding torch, and the like may be inconvenient and time consuming. A gas shielding apparatus which may be efficiently and economically manufactured, installed and removed would be particularly valuable.

OBJECTS AND SUMMARY OF THE INVENTION

It is a primary object of the invention to provide a gas shielding apparatus for substantially isolating and protecting the molten metal of a weld from atmospheric gases.

A further object of the invention is to provide a gas shielding apparatus which uses a single source of inert gas for shielding the molten metal of a weld.

Another object of the invention is to provide a gas shielding apparatus which provides at least two separate streams of shielding gas for protecting the molten metal.

Yet another object of the invention is to provide a gas shielding apparatus which may be efficiently and conveniently coupled to and removed from a welding torch.

A more general object herein is to provide a gas shielding apparatus which may be efficiently and economically manufactured and maintained.

In summary, this invention provides a gas shielding apparatus which is particularly suitable for isolating and protecting a weld from atmospheric gases. The gas shielding apparatus of the invention includes a torch body portion for supporting the electrode of a welding torch. The torch body portion has a primary shield plenum for producing a primary shield stream of a gaseous substance. A shroud body portion is positioned outwardly of the torch body. A trailer shield portion extending laterally from the shroud body has a trailer shield plenum for producing a trailer shield stream of the gaseous substance. A gas distribution structure is coupled to the primary shield plenum, secondary shield plenum and the trailer shield plenum for distributing measured amounts of the gaseous substance from an external source to the different plenums.

In one aspect of the invention, the shroud body portion has a secondary shield plenum for producing a secondary shield stream of the gaseous substance. The secondary shield stream, which substantially surrounds the primary shield stream produced in the first plenum, preferably has a higher velocity than the primary shield stream. The trailer shield stream has a velocity approximating that of the primary shield stream. The combination of three shield streams enhances the protection provided by the gas shielding apparatus.

The streams of the protective gas cooperate to provide a substantially impermeable barrier protecting the weld from exposure to the potentially contaminating atmospheric gases. With the gas distribution structure of the invention, a single source of inert gas may be used to provide the primary shielding stream and the trailer shielding stream with a supply of protective gas at the required flow rates.

Additional objects and features of the invention will be more readily apparent from the following detailed description and appended claims when taken in conjunction with the drawings.

BRIEF DESCRIPTION OF THE DRAWINGS

FIG. 1 is a side view of a gas shielding apparatus in accordance with the invention.

FIG. 2 is a cross section view of the gas shielding apparatus of FIG. 1, shown with an electrode supported by the torch body.

FIG. 3 is a cross sectional view taken along line 3—3 of FIG. 2.

DETAILED DESCRIPTION OF THE INVENTION

Reference will now be made in detail to the preferred embodiment, which is illustrated in the accompanying figures. Turning now to the drawings, wherein like components are designated by like reference numerals throughout the various figures, attention is directed to FIG. 1 to 3.

A gas shielding apparatus 10 incorporating the invention is shown particularly in FIGS. 1 and 2. The gas shield 10, which is particularly suitable for shielding the hot metal of a weld with inert protective gas, includes an outer shroud or shroud body 12 and a trailer shield portion 14. The gas shield 10 is used to blanket the weld with an inert gas, as for example argon or another protective gas employed in the art for shielding a weld. A conduit 16 extends from the upper portion of outer shroud 12 to trailer shield portion 14 for delivering the inert gas from the shroud to the trailer shield.

The shroud body delivers a stream of inert gas which substantially surrounds the electrode and primary shield stream to further protect the weld pool. The stream of inert gas flowing from the trailer shield covers the hot portion of the weld immediately behind the weld pool with a protective shield. Preferably, the weld is protected by the inert gas until the temperature of the metal has cooled sufficiently to avoid contamination by atmospheric gases. For example, when the weld material is titanium, the weld is preferable covered by the inert gas until the temperature of the weld is less than 200° F. At temperatures above 1200° F., titanium may react with gases in the atmosphere and become brittle. Thus, the general length of the trailer shield portion 14 will depend in part on the type of material used for the weld, the cooling rate of the weld material and the rate at which the weld is formed.

As shown particularly in FIG. 2, the outer shroud body 12 is positioned outwardly of a torch body, generally designated 18. In this embodiment, torch body 18 is provided by a collet 20 positioned in a collet body 22 and a gas cup or nozzle 24 mounted to the collet body 22. An electrode 26 for welding a workpiece is supported by collet 20 and positioned so that the tip 27 of the electrode projects from the lower edge of the shroud body. Electrode 26 may be formed of pure tungsten or a tungsten alloy. Using means known in the art, the torch body 18 is coupled to an electricity source 28 and a source of inert gas 30 such as argon. Similarly, the torch body 18 may also be coupled to a cooling source (not shown) by means known in the art.

In this embodiment, outer shroud 12 is mounted to the gas cup or nozzle 24 of the torch body. The tight fit provided in part by the O-rings 31 between the shroud and the nozzle secures the shroud 12 to the torch body. The shroud body may be easily removed, for maintenance, replacement of the electrode, and the like, by pulling the shroud from the torch body. Sealing means, such as the O-rings 31, are retained between the nozzle and the shroud body 12 to prevent the leakage of the inert gas and atmospheric gases between the nozzle exterior and the interior of the shroud body. Although in this embodiment the torch body is provided by a collet, collet body and nozzle, it should be understood that the torch body may take other forms within the scope of the invention. Moreover, although in this embodiment the outer shroud 12 is mounted to nozzle 24, in other modifications of the invention the nozzle 24 may be replaced by an inner shroud or nozzle integral with the outer shroud 12.

With this invention, the gas shielding apparatus includes several separate plenums for providing a protective envelope for shielding the weld pool and the hot weld from the gases in the atmosphere. Torch body 18 has a primary shield plenum, generally designated at 32, for producing a primary shield stream of inert gas. As is indicated by arrows 34, the primary shield stream substantially surrounds electrode 26 and tip 27 and provides the primary protection for the weld pool. In this embodiment, primary shield plenum 32 is defined by a recessed portion 36 of the collet 20. The primary shield plenum is separated into a primary plenum portion 32a and a secondary plenum portion 32b by a metering plate such as ring 38. The metering ring 38, which is seated on a shoulder 40 formed on the interior of collet body 22, includes a plurality of apertures 39 for metering the flow of inert gas through primary shield plenum 32.

In the preferred form of the invention, shroud body 12 has a secondary shield plenum, generally designated 42, for producing a secondary shield stream of protective gas. The secondary shield stream, represented in FIG. 2 by arrows 44, substantially surrounds the primary shield stream. As is discussed below in more detail, the secondary shield stream preferably has a velocity greater than that of the primary shield stream. Providing two separate shield streams of different velocity around the electrode substantially increases the effectiveness of the protective shield separating the weld pool from atmospheric gases. Secondary shield plenum 42 is defined by the exterior of nozzle 24 and the interior wall of the shroud body 12. The secondary shield plenum includes a primary portion 42a and a secondary portion 42b separated by a metering plate or barrier 46. A plurality of apertures 48 are formed in the barrier for metering the flow of the inert gas through secondary shield plenum 42.

Trailer shield portion 14 includes a peripheral skirt 50 which defines a trailer shield plenum, generally designated 52, for producing a trailer shield stream of inert gas. The trailer shield stream, represented by arrows 53, shields the hot metal of the weld behind the weld pool from atmospheric gases. In this embodiment, the interior edge of the trailer shield stream mixes with the exterior edge of the secondary shield stream, preventing infiltration of atmospheric gases between the two streams so that the gas shield 10 provides a continuous protective shield over the weld pool and the just solidified hot metal behind the weld. The trailer shield plenum 52 is divided into a primary plenum portion 52a and a secondary plenum portion 52b by a metering plate 54 which includes a plurality of apertures 56 for metering the flow of inert gas through the trailer shield plenum 52.

The gas shielding apparatus 10 includes a gas distribution structure, generally designated 60, for delivering an inert gas from an inlet tube 61 to the primary shield plenum 32, the secondary shield plenum 42 and the trailer shield plenum 52. In this embodiment, the gas distribution structure includes a first delivery passage 62 extending from inlet tube 61 to the primary shield plenum. The secondary/trailer distribution passages 63 and 64, which are coupled to the first delivery passage upstream from the primary shield plenum, receives its supply as a result of the resistance created by the primary shield metering ring 38. The secondary shield plenum 42 extends through conduit 16 to the trailer shield plenum 52. The inert gas enters the torch body 18 through inlet tube 61 and flows through the first delivery passage 62 to the primary shield plenum, through the second delivery passages 63 and 64 to the secondary shield plenum and through conduit 16 to the trailer shield plenum.

The gas distribution structure 60 also includes means for metering the flow of gas through the first and second delivery passages 62, 63 and 64 to distribute a measured amount of gas to each plenum. One such metering means is provided by apertures 39, 48, and 56 formed in the metering ring 38, barrier 46 and metering plate 54, respectively, shown in FIGS. 2 and 3. The metering apertures provide a substantially accurate distribution of shielding gas between the three plenums independent of the pressure of the gas. By altering the size and number of the apertures in one or more of the metering ring, barrier and metering plate, the distribution of gas between the primary shield stream, the secondary shield stream and the trailer shield stream may be adjusted. For example, ten to fifteen percent of the inert gas passes through the first metering ring 38 while eighty-five to ninety percent of the inert gas flows through the secondary delivery passages 63 and 64 into the secondary/trailer shielding systems. Preferably, ten to fifteen percent of the gas flow is directed to the secondary plenum portion 32b of the primary shield plenum, thirty-five to forty percent is directed to the secondary plenum portion 42b of the secondary shield plenum, and forty-seven to fifty percent is directed to the secondary plenum portion 52b of the trailer shield plenum. This distribution of the inert gas is particularly suitable for covering the weld pool and hot weld behind the pool with a protective shield of inert gas.

The inert gas entering the torch body 18 at inlet tube 61 is directed by the generally low resistance of the first and second delivery passages 62, 63 and 64 to the primary plenum portions of the primary, secondary and trailer shield plenums. The number of metering apertures 39, 48 and 56 in the metering ring 38, barrier 46 and metering plate 54 provides a substantially equal head of pressure in the primary plenum portion in each of the plenums, while allowing unrestricted passage of the gas through the apertures 39, 48 and 56. Preferably, the primary plenum portions are at a high pressure to provide each plenum with a uniform supply of inert gas before the gas is metered by apertures 39, 48 and 56. The secondary plenum portions 32b, 42b and 52b lower the velocity of the metered gas and diffuse the gas to provide an even stream. The primary shield stream is further diffused by inner diffusion screens 66 retained in the torch body 18. An exterior diffusion screen 68 extends substantially across the secondary shield plenum 42 and the trailer shield plenum 52 for diffusing the secondary and trailer shield streams. The secondary plenum portions and the diffusion screens ensure that the shield streams leaving the gas shield and contacting atmospheric gases are surrounded by turbulent flow. The turbulence surrounding the streams of inert gas provide an additional barrier between the weld pool and the hot metal of the weld, further protecting the weld from contamination.

In the preferred form of the invention, metering apertures 39 and 48 are sized and positioned so that the flow rate of the inert gas passing through the secondary shield plenum 42 is greater that of the inert gas flowing through the primary plenum. Thus, the secondary shield stream has a higher velocity than the primary shield stream. Preferably, the velocity of the secondary shield stream is thirty percent greater than the velocity of the primary shield stream. In this embodiment, the apertures 56 in the metering plate 54 are sized and positioned so that the velocity of the trailer shield stream is approximately equal to the velocity of the primary shield stream.

Providing the primary and secondary shield streams with different velocities produces a substantially impermeable barrier between the gas shear edges for increased protection of the weld pool. The slower velocity of the primary shield stream relative to the secondary shield stream prevents the development of a venturi effect at the outermost edge of the secondary shield stream which may draw atmospheric gas toward the weld pool. The secondary shield stream augments the primary shield stream, creating a positive pressure so that an entirely inert atmosphere surrounds the weld puddle. With the gas shield 10 of the invention, substantial shield protection is provided with only a fraction of the inert gas used in conventional torch/trailer arrangements.

Gas shield 10 of the invention produces an envelope of inert gas which substantially shields and protects the weld from contamination by atmospheric gases. A single gas source supplies the inert gas required to produce the primary, secondary and trailer shield streams. Using a single gas source greatly improves the efficiency of the gas shield device. Moreover, the auxiliary gas source and attached tubes are no longer required.

In above-described embodiment, the secondary shield plenum 42 is provided in shroud body 12 for producing a secondary shield stream that substantially surrounds the primary shield stream and enhancing the protection provided by the gas shield. However, in other forms of the invention the secondary shield plenum may be eliminated with the gas distribution structure delivering the inert gas from a single source to the primary and trailer shield plenums. The primary and trailer shield streams produced by the gas shield would cover and shield the weld area with the inert gas.

The foregoing descriptions of specific embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the Claims appended hereto and their equivalents.

What is claimed is:

1. A gas shielding apparatus for use with an electrode of a welding torch assembly having a torch body supporting said electrode with a tip of said electrode projecting from said torch body, said torch body having a primary shield plenum defined therein for producing a primary shield stream, and first delivery means for delivering a gaseous substance to said primary shield plenum, said gas shielding apparatus comprising:

a shroud body mountable to said torch body, said shroud body substantially surrounding said torch body and having a secondary shield plenum defined therein for producing a secondary shield stream substantially surrounding said primary shield stream;

a trailer shield portion extending laterally from said shroud body, said trailer shield portion having a trailer shield plenum defined therein for producing a trailer shield stream; and second delivery means for delivering measured amounts of said gaseous substance from said first delivery means to said secondary shield plenum and said trailer shield plenum, said second delivery means being coupled to said first delivery means upstream from said primary shield plenum when said shroud body is mounted to said torch body, said gas second delivery means including at least one perforated metering plate configured and positioned to meter the flow of said gaseous substance from said first delivery means and deliver a first predetermined amount of said gaseous substance to said secondary shield plenum and a second predetermined amount of said gaseous substance to said trailer shield plenum.

2. The gas shielding apparatus of claim 1 wherein said first-mentioned metering plate is associated with said secondary shield plenum and said second delivery means further includes a second metering plate associated with said trailer shield plenum, said first-mentioned metering plate having a plurality of first apertures for metering the flow of said gaseous substance through said secondary shield plenum and said second metering plate having a plurality of second apertures for metering the flow of said gaseous substance through said trailer shield plenum.

3. The gas shielding apparatus of claim 1 wherein said second delivery means includes a conduit extending from said shroud body to said trailer shield portion, said conduit having an inlet positioned upstream of said secondary shield plenum and an outlet opening into said trailer shield plenum.

4. The gas shielding apparatus of claim 1 wherein said second delivery means is formed for delivering approximately 85 to 90 percent of said gaseous substance transported by said first delivery means to said secondary shield plenum and said trailer shield plenum.

5. The gas shielding apparatus of claim 1 wherein said secondary shield plenum and said trailer shield plenum each have a primary plenum portion and a secondary plenum portion and wherein said metering plate extends between said primary plenum portion and said secondary plenum portion for metering the flow of said gaseous substance from said primary plenum portion to said secondary plenum portion.

6. The gas shielding apparatus of claim 1, and further comprising sealing means for preventing passage of at least one of said gaseous substance and atmospheric gases between said torch body and said shroud body.

7. The gas shielding apparatus of claim 1, and further comprising a diffusion screen extending substantially across said secondary shield plenum and said trailer shield plenum.

8. A gas shielding apparatus for shielding a weld formed with an electrode of a welding torch assembly with a gaseous substance, said gas shielding apparatus comprising:

a torch body portion for supporting said electrode, said torch body portion having a first chamber defining a first plenum for producing a primary shield stream of said gaseous substance;

a shroud body portion positioned outwardly of said torch body portion and having a second chamber defining a second plenum for producing a secondary shield stream of said gaseous substance substantially surrounding said primary shield stream;

a trailer shield portion extending laterally from said shroud body portion and having a third chamber defining a third plenum for producing a trailer shield stream of said gaseous substance; and gas distribution means coupled to said first plenum, said second plenum and said third plenum for distributing measured amounts of a gaseous substance from an external supply to said first plenum, said second plenum and said third plenum, said gas distribution means including a flow metering system for transporting said gaseous substance through said first plenum at a first flow rate and through said second plenum at a second flow rate greater than said first flow rate to provide said secondary shield stream with a greater velocity than said primary shield stream and form a gas impermeable barrier between said primary shield stream and said secondary shield stream.

9. The gas shielding apparatus of claim 8 wherein said second flow rate is approximately 30 percent greater than said first flow rate.

10. The gas shielding apparatus of claim 8 wherein said gas distribution means is formed for flow of said gaseous substance through said trailer shield plenum at a third flow rate approximately equal to said first flow rate.

11. The gas shielding apparatus of claim 8 wherein said gas distribution means is formed for delivering approximately 10 to 15 percent of said gaseous substance transported by said gas distribution means to said first plenum, approximately 35 to 40 percent of said gaseous substance transported by said gas distribution means to said second plenum and approximately 47 to 53 percent of said gaseous substance transported by said gas distribution means to said third plenum.

12. The gas shielding apparatus of claim 8 wherein at least one of said first plenum, said second plenum and said third plenum each have a primary plenum portion and a secondary plenum portion and wherein said metering system is configured for metering the flow of said gaseous substance from said primary plenum portion to said secondary plenum portion.

13. The gas shielding apparatus of claim 12 wherein said metering system includes a metering plate separating said primary plenum portion and said secondary plenum portion, said metering plate having a plurality of apertures formed in said plate for metering said gaseous substance.

14. The gas shielding apparatus of claim 8 wherein said torch body portion includes a collet body and a nozzle mounted thereto and said gas distribution means includes a plurality of apertures formed in at least one of said collet body and said nozzle for flow of said gaseous substance from said torch body portion to said second plenum and said third plenum.

15. The gas shielding apparatus of claim 8, and further comprising a diffusion screen substantially covering said second plenum and said third plenum.

16. A gas shielding apparatus for shielding a weld formed with an electrode of a welding torch assembly, said gas shielding apparatus comprising:
- a torch body portion adapted for supporting said electrode with a tip of said electrode projecting from said torch body portion, said torch body portion having a primary shield plenum defined therein for producing a primary shield stream;
- a shroud body portion positioned outwardly of said torch body;
- a trailer shield portion extending laterally from said shroud body portion, said trailer shield portion having a trailer shield plenum defined therein for producing a trailer shield stream; and
- gas distribution means coupled to said primary shield plenum and said trailer shield plenum for transporting measured amounts of a gaseous substance from an external supply to said primary shield plenum and said trailer shield plenum, said gas distribution means including at least one perforated metering plate configured and positioned to meter the flow of said gaseous substance from said external supply and deliver a first predetermined amount of said gaseous substance to said primary shield plenum and a second predetermined amount of said gaseous substance to said trailer shield plenum.

17. The gas shielding apparatus of claim 16 wherein said shroud body portion has a secondary shield plenum defined therein, said gas distribution means being formed for delivery of a measured amount of said gaseous substance to said secondary shield plenum.

18. The gas shielding apparatus of claim 16 wherein said first-mentioned metering plate is positioned in said primary shield plenum and said gas distribution means further includes a second metering plate positioned in said trailer shield plenum, said first-mentioned metering plate having a plurality of first apertures for metering the flow of said gaseous substance through said primary shield plenum and said second metering plate having a plurality of second apertures for metering the flow of said gaseous substance through said trailer shield plenum.

19. The gas shielding apparatus of claim 16 wherein said primary shield plenum and said trailer shield plenum each have a primary plenum portion and a secondary plenum portion and wherein said gas distribution means is formed for metering the flow of said gaseous substance from said primary plenum portion to said secondary plenum portion.

* * * * *